(12) United States Patent
Huang et al.

(10) Patent No.: US 8,386,546 B2
(45) Date of Patent: Feb. 26, 2013

(54) MONTGOMERY MULTIPLICATION ARCHITECTURE

(75) Inventors: Miaoqing Huang, Washington, DC (US); Krzysztof Gaj, Centreville, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 495 days.

(21) Appl. No.: 12/714,987

(22) Filed: Mar. 1, 2010

(65) Prior Publication Data

US 2011/0225220 A1    Sep. 15, 2011

Related U.S. Application Data

(60) Provisional application No. 61/156,071, filed on Feb. 27, 2009.

(51) Int. Cl.
*G06F 3/00* (2006.01)
*G06F 13/00* (2006.01)

(52) U.S. Cl. ......... 708/205; 708/207; 708/236; 708/400

(58) Field of Classification Search ........................ None
See application file for complete search history.

(56) References Cited

U.S. PATENT DOCUMENTS

| 2008/0065713 A1* | 3/2008 | Lee et al. ........... 708/491 |
| 2008/0114820 A1* | 5/2008 | Amin et al. ........ 708/209 |

* cited by examiner

*Primary Examiner* — Scott Sun
(74) *Attorney, Agent, or Firm* — David Grossman; Edgar Rodriguez

(57) ABSTRACT

A Montgomery multiplication device calculates a Montgomery product of an operand X and an operand Y with respect to a modulus M and includes a plurality of processing elements. In a first clock cycle, two intermediate partial sums are created by obtaining an input of length w−1 from a preceding processing element as w−1 least significant bits. The most significant bit is configured as either zero or one. Then, two partial sums are calculated using a word of the operand Y, a word of the modulus M, a bit of the operand X, and the two intermediate partial sums. In a second clock cycle, a selection bit is obtained and one of the two partial sums is selected based on the value of the selection bit. Then, the selected partial sum is used for calculation of a word of the Montgomery product.

20 Claims, 17 Drawing Sheets

Conversion between ordinary and Montgomery domains

| Ordinary Domain | $\Leftrightarrow$ | Montgomery Domain |
|---|---|---|
| $X$ | $\updownarrow$ | $X' = X \cdot 2^n \pmod{M}$ |
| $Y$ | $\updownarrow$ | $Y' = Y \cdot 2^n \pmod{M}$ |
| $XY$ | $\updownarrow$ | $(X \cdot Y)' = X' \cdot Y' \cdot 2^{-n} \pmod{M}$ |

FIG. 1 (Prior Art)

Process 1: Radix-2 Montgomery Multiplication

Input: odd $M, n = \lfloor \log_2 M \rfloor + 1, X = \sum_{i=0}^{n-1} x_i \cdot 2^i$, with $0 \leq X, Y < M$

Output: $Z = MP(X, Y, M) \equiv X \cdot Y \cdot 2^{-n} \pmod{M}, 0 \leq Z < M$ 1.1   $S[0] = 0;$
1.2   for $i = 0$ to $n - 1$ step $1$ do
1.3      $q_i = (x_i \cdot Y_0) \oplus S[i]_0;$
1.4      $S[i+1] = (S[i] + x_i \cdot Y + q_i \cdot M)/2;$
1.5   if $S[n] > M$ then
1.6      $S[n] = S[n] - M;$
1.7   return $Z = S[n];$

FIG. 2 (Prior Art)

Process 2: Multiple-Word Radix-2 Montgomery Multiplication Algorithm

Input: odd $M, n = \lfloor \log_2 M \rfloor + 1$, word size $w$, $e = \lceil \frac{n+1}{w} \rceil$,
$X = \sum_{i=0}^{n-1} x_i \cdot 2^i$, $Y = \sum_{j=0}^{e-1} Y^{(j)} \cdot 2^{w \cdot j}$,
$M = \sum_{j=0}^{e-1} M^{(j)} \cdot 2^{w \cdot j}$, with $0 \leq X, Y < M$ Output: $Z = \sum_{j=0}^{e-1} S^{(j)} \cdot 2^{w \cdot j} = MP(X, Y, M) \equiv X \cdot Y \cdot 2^{-n}$
$\pmod M$, $0 \leq Z < 2M$ /*initialize all words of $S$*/

2.1 $S = 0$;
2.2 for $i = 0$ to $n - 1$ step 1 do
2.3 $\quad q_i = (x_i \cdot Y_0^{(0)}) \oplus S_0^{(0)}$;
2.4 $\quad (C^{(1)}, S^{(0)}) = x_i \cdot Y^{(0)} + q_i \cdot M^{(0)} + S^{(0)}$;
2.5 $\quad$ for $j = 1$ to $e$ step 1 do
2.6 $\quad\quad (C^{(j+1)}, S^{(j)}) = C^{(j)} + x_i \cdot Y^{(j)} + q_i \cdot M^{(j)} + S^{(j)}$;
2.7 $\quad\quad S^{(j-1)} = (S_0^{(j)}, S_{w-1..1}^{(j-1)})$;
2.8 $\quad S^{(e)} = 0$;
2.9 return $Z = S$;

FIG. 3 (Prior Art)

Process 3: Computations in Task D

Input: $x_i$, $Y(0)$, $M(0)$, $S_0^{(1)}$, $S_{w-1,1}^{(0)}$

Output: $q_i$, $C^{(1)}$, $S_{w-1,1}^{(0)}$ 3.1  $q_i = (x_i \cdot Y_0^{(0)}) \oplus S_0^{(0)}$;

3.2  $(CO^{(1)}, SO_{w-1}^{(0)}, S_{w-2,0}^{(0)}) = (1, S_{w-1,1}^{(0)}) + x_i \cdot Y^{(0)} + q_i \cdot M^{(0)}$;

3.3  $(CE^{(1)}, SE_{w-1}^{(0)}, S_{w-2,0}^{(0)}) = (0, S_{w-1,1}^{(0)}) + x_i \cdot Y^{(0)} + q_i \cdot M^{(0)}$;

3.4  if $S_0^{(1)} = 1$ then

3.5  $\quad C^{(1)} = CO^{(1)}$;

3.6  $\quad S_{w-1,1}^{(0)} = (SO_{w-1}^{(0)}, S_{w-2,1}^{(0)})$;

3.7  else

3.8  $\quad C^{(1)} = CE^{(1)}$;

3.9  $\quad S_{w-1,1}^{(0)} = (SE_{w-1}^{(0)}, S_{w-2,1}^{(0)})$;

FIG. 11

Process 4: Computations in Task E

Input: $q_i, x_i, C(j), Y(j), M(j), S_0^{(j+1)}, S_0^{(j)}, S_{w-1,1}^{(j)}, S_{w-2,0}^{(j)}$

Output: $C(j+1), S_0^{(j+1)}, S_{w-1,1}^{(j)}, S_0^{(j)}$ 4.1 $\left(CO(j+1), SO_{w-1,1}^{(j)}, S_0^{(j)}\right) = \left(1, S_{w-1,1}^{(j)}\right) + C(j) + x_i \cdot Y(j) + q_i \cdot M(j);$ 4.2 $\left(CE(j+1), SE_{w-1,1}^{(j)}, S_0^{(j)}\right) = \left(0, S_{w-1,1}^{(j)}\right) + C(j) + x_i \cdot Y(j) + q_i \cdot M(j);$ 4.3 if $S_0^{(j+1)} = 1$ then

4.4     $C(j+1) = CO(j+1);$ 4.5     $S_{w-1,1}^{(j)} = \left(SO_{w-1,1}^{(j)}, S_{w-2,1}^{(j)}\right);$ 4.6 else

4.7     $C(j+1) = CE(j+1);$ 4.8     $S_{w-1,1}^{(j)} = \left(SE_{w-1,1}^{(j)}, S_{w-2,1}^{(j)}\right);$

FIG. 12

Process 6: Multiple-Word Radix-4 Montgomery Multiplication Algorithm

Input: odd $M$, $n = \lfloor \log_2 M \rfloor + 1$, word size $w$, $e = \lceil \frac{n+1}{w} \rceil$,
$X = \sum_{i=0}^{\lceil \frac{n}{2} \rceil - 1} x^{(i)} \cdot 4^i$, $Y = \sum_{j=0}^{e-1} Y^{(j)} \cdot 2^{w \cdot j}$,
$M = \sum_{j=0}^{e-1} M^{(j)} \cdot 2^{w \cdot j}$, with $0 \leq X, Y < M$ Output: $Z = \sum_{j=0}^{e-1} S^{(j)} \cdot 2^{w \cdot j} = MP(X, Y, M) \equiv X \cdot Y \cdot 2^{-n}$
(mod $M$), $0 \leq Z < 2M$ 6.1 $S = 0$;  /*initialize all words of $S$*/
6.2 for $i = 0$ to $n - 1$ step 2 do
6.3     $q^{(i)} = Func(S_{1..0}^{(0)}, Y_{1..0}^{(0)}, x^{(i)}, M_{1..0}^{(0)})$; /*$q^{(i)}$ and $x^{(i)}$ are 2-bit long*/
6.4     $(C^{(0)}, S^{(0)}) = S^{(0)} + x^{(i)} \cdot Y^{(0)} + q^{(i)} \cdot M^{(0)}$; /*$C$ is 3-bit long*/
6.5     for $j = 1$ to $e - 1$ step 1 do
6.6         $(C^{(j+1)}, S^{(j)}) = C^{(j)} + S^{(j)} + x^{(i)} \cdot Y^{(j)} + q^{(i)} \cdot M^{(j)}$;
6.7         $S^{(j-1)} = (S_{1..0}^{(j)}, S_{w-1..2}^{(j-1)})$;
6.8     $S^{(e-1)} = (C_{1..0}^{(e)}, S_{w-1..2}^{(e-1)})$;
6.9 return $Z = S$;

FIG. 16

MONTGOMERY MULTIPLICATION ARCHITECTURE

CROSS-REFERENCE TO RELATED APPLICATIONS

This application claims the benefit of U.S. Provisional Application No. 61/156,071, filed Feb. 27, 2009, entitled "A Montgomery Multiplication Hardware Architecture," which is hereby incorporated by reference in its entirety.

BACKGROUND

Montgomery modular multiplication is one of the fundamental operations used in cryptographic processes, such as Rivest, Shamir and Adleman (RSA) and Elliptic Curve Cryptosystems. Since the introduction of the RSA process in 1978, high-speed and space-efficient hardware architectures for modular multiplication have been a subject of constant interest for almost 30 years. During this period, one of the most useful advances came with the introduction of the Montgomery multiplication process due to Peter L. Montgomery. Montgomery multiplication is a basic operation of modular exponentiation, which may be used in the RSA public-key cryptosystem. It may also be used in Elliptic Curve Cryptosystems, and several methods of factoring, such as Elliptic Curve Method (ECM), p−1, and Pollard's "rho" method, as well as in many other cryptographic and cryptanalytic transformations.

BRIEF DESCRIPTION OF THE SEVERAL VIEWS OF THE DRAWINGS

FIG. 1 is a table presenting conversion between ordinary and Montgomery domains.

FIG. 2 shows pseudocode for a Radix-2 Montgomery Multiplication process.

FIG. 3 shows a pseudocode for a multiple-word Radix-2 Montgomery Multiplication process.

FIG. 11 is a pseudocode for computations in Task D as per an aspect of an embodiment of the present invention.

FIG. 12 is a pseudocode for computations in Task E as per an aspect of an embodiment of the present invention.

FIG. 16 is a pseudocode for a multiple-word Radix-4 Montgomery Multiplication process as per an aspect of an embodiment of the present invention.

DETAILED DESCRIPTION OF EMBODIMENTS

Figure 4:
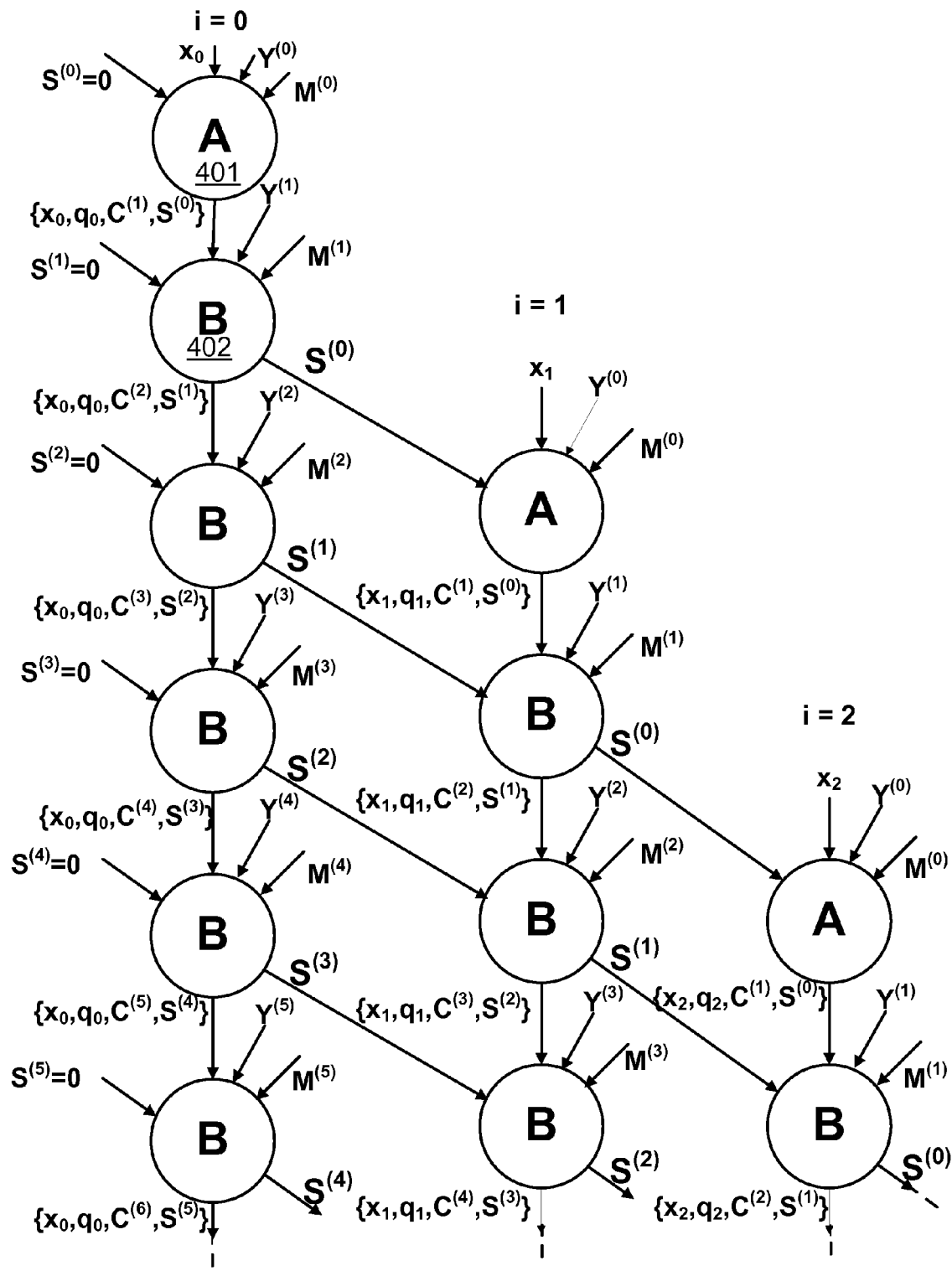
FIG. 4 is a data dependency graph of an original architecture of MWR2MM process.

Embodiments of the present invention implement Montgomery modular multiplication between an operand X and an operand Y with a modulus M.

Montgomery multiplication is presented as X.Y (mod M), assuming M>0 and M being an odd integer. In many cryptosystems, such as RSA, computing X.Y (mod M) is a crucial operation. The reduction of X.Y (mod M) is a more time-consuming action than the multiplication X.Y without reduction. Montgomery introduced a method for calculating products (mod M) without the costly reduction (mod M). This has since been known as Montgomery multiplication. Montgomery multiplication of X and Y (mod M), denoted by MP(X, Y, M), is defined as $X.Y.2^{-n}$ (mod M) for some fixed integer n.

Since Montgomery multiplication is not an ordinary multiplication, there is a conversion process between the ordinary domain (with ordinary multiplication) and the Montgomery domain. FIG. 1 is a table presenting conversion between ordinary and Montgomery domains. The conversion between the ordinary domain and the Montgomery domain is given by the relation $X \Leftrightarrow X'$, where $X'=X.2^n$ (mod M).

FIG. 1 shows that the conversion is compatible with multiplications in each domain, since $$MP(X', Y', M) \equiv X' \cdot Y' \cdot 2^{-n} \quad (1)$$
$$\equiv (X \cdot 2^n) \cdot (Y \cdot 2^n) \cdot 2^{-n}$$
$$\equiv X \cdot Y \cdot 2^n$$
$$\equiv (X \cdot Y)'$$

The conversion between each domain could be done using the same Montgomery operation, in particular $X'=MP(X, 2^{2n} \pmod{M}, M)$ and $X=MP(X', 1, M)$, where $2^{2n} \pmod{M}$ could be precomputed. Despite the initial conversion cost, an advantage is achieved over ordinary multiplication if many Montgomery multiplications are performed followed by an inverse conversion at the end, such as the scenario in RSA.

Process 1 in FIG. 2 is a pseudocode for Radix-2 Montgomery Multiplication process. In Process 1, $\lfloor n=\log_2 M \rfloor+1$, wherein n is the precision of M. The verification of Process 1 is given below: S[i] is defined as:

$$S[i] \equiv \frac{1}{2^i}\left(\sum_{j=0}^{i-1} x_j \cdot 2^j\right) \cdot Y \pmod{M} \quad (2)$$

with $S[0]=0$. Then, $S[n]=X.Y.2^{-n} \pmod{M}=MP(X,Y,M)$. $S[n]$ can be computed iteratively using the following dependence:

$$S[i+1] \equiv \frac{1}{2^{i+1}} \left( \sum_{j=0}^{i} x_j \cdot 2^j \right) \cdot Y \qquad (3)$$

$$\equiv \frac{1}{2^{i+1}} \left( \sum_{j=0}^{i-1} x_j \cdot 2^j + x_i \cdot 2^i \right) \cdot Y$$

$$\equiv \frac{1}{2} \left( \frac{1}{2^i} \left( \sum_{j=0}^{i-1} x_j \cdot 2^j \right) \cdot Y + x_i \cdot Y \right)$$

$$\equiv \frac{1}{2}(S[i] + x_i \cdot Y) \pmod{M}.$$

Therefore, $S[i+1]$ depends on the parity of $S[i]+x_i.Y$. In order to make the numerator divisible by 2, $S[i+1]$ may be computed as $$S[i+1] = \frac{S[i]+x_i \cdot Y}{2} \text{ or } \frac{S[i]+x_i \cdot Y+M}{2} \qquad (4)$$

Since $Y<M$ and $S[0]=0$, it may be concluded that $0 \leq S[i] < 2M$ for all $0 \leq i < n$. The result of a Montgomery multiplication $X.Y.2^{-n} \pmod{M} < 2M$ when $X,Y<2M$ and $2^n>4M$. As a result, by redefining n to be the smallest integer such that $2^n>4M$, the subtraction at the end of Process 1 can be avoided and the output of the multiplication directly used as an input for the next Montgomery multiplication.

A word-based process for Montgomery multiplication, called Multiple-Word Radix-2 Montgomery Multiplication (MWR2MM), as well as a scalable hardware architecture capable of executing this process was introduced in the article authored by A. F. Tenca and C. K. Koc, entitled "A scalable architecture for Montgomery multiplication," and published in CHES '99, Springer-Verlag Lecture Notes in Computer Sciences, vol. 1717, 1999, pp. 94-108. Several follow-up designs based on the MWR2MM process have been proposed in order to reduce the computation time. The embodiments of this invention focus on the optimization of hardware architectures for MWR2MM and MWR4MM processes in order to minimize the number of clock cycles required to compute an n-bit precision Montgomery multiplication. Process 2 in FIG. 3 is a pseudocode for multiple-word Radix-2 Montgomery Multiplication process as presented by Tenca and Koc.

In Process 2, the operand Y (multiplicand) is scanned word-by-word, and the operand X is scanned bit-by-bit. The operand length is n bits, and the word-length is w bits.

$$e = \left\lceil \frac{n+1}{w} \right\rceil$$

words are required to store S since its range is $[0, 2M-1]$. The original M and Y are extended by one extra bit of 0 as the most significant bit. M, Y, S, and X may be presented as vectors, $M=(0, M^{(e-1)}, \ldots, M^{(1)}, M^{(0)})$, $Y=(0, Y^{(e-1)}, \ldots, Y^{(1)}, Y^{(0)})$, $S=(0, S^{(e-1)}, \ldots, S^{(1)}, S^{(0)})$, and $X=(x_{n-1}, \ldots, x_1, x_0)$. The carry variable $C^{(j)}$ has two bits, as explained below. Assuming $C^{(0)}=0$, each subsequent value of $C^{(j+1)}$ is given by $(C^{(j+1)},S^{(j)})=C^{(j)}+x_i.Y^{(j)}+q_i.M^{(j)}+S^{(j)}$.

If it $C^{(j)} \leq 3$ is assumed, then the following may be obtained:

$$\begin{aligned}(C^{(j+1)}, S^{(j)}) &= C^{(j)} + x_i \cdot Y^{(j)} + q_i \cdot M^{(j)} + S^{(j)} \leq \\ &\quad 3 + 3 \cdot (2^w - 1) \\ &= 3 \cdot 2^w.\end{aligned} \qquad (5)$$

From (5), $C^{(j+1)} \leq 3$ may be concluded. By induction, $C^{(j)} \leq 3$ is ensured for any $0 \leq j \leq e-1$. Additionally, based on the fact that $S \leq 2M$, it is concluded that $C^{(e)} \leq 1$.

FIG. 4 is a data dependency graph of the original architecture of MWR2MM process. Each circle in the graph represents an atomic computation and is labeled according to the type of action performed. Task A 401 includes computing lines 2.3 and 2.4 in Process 2. Task B 402 corresponds to computing lines 2.6 and 2.7 in Process 2.

Figure 5:
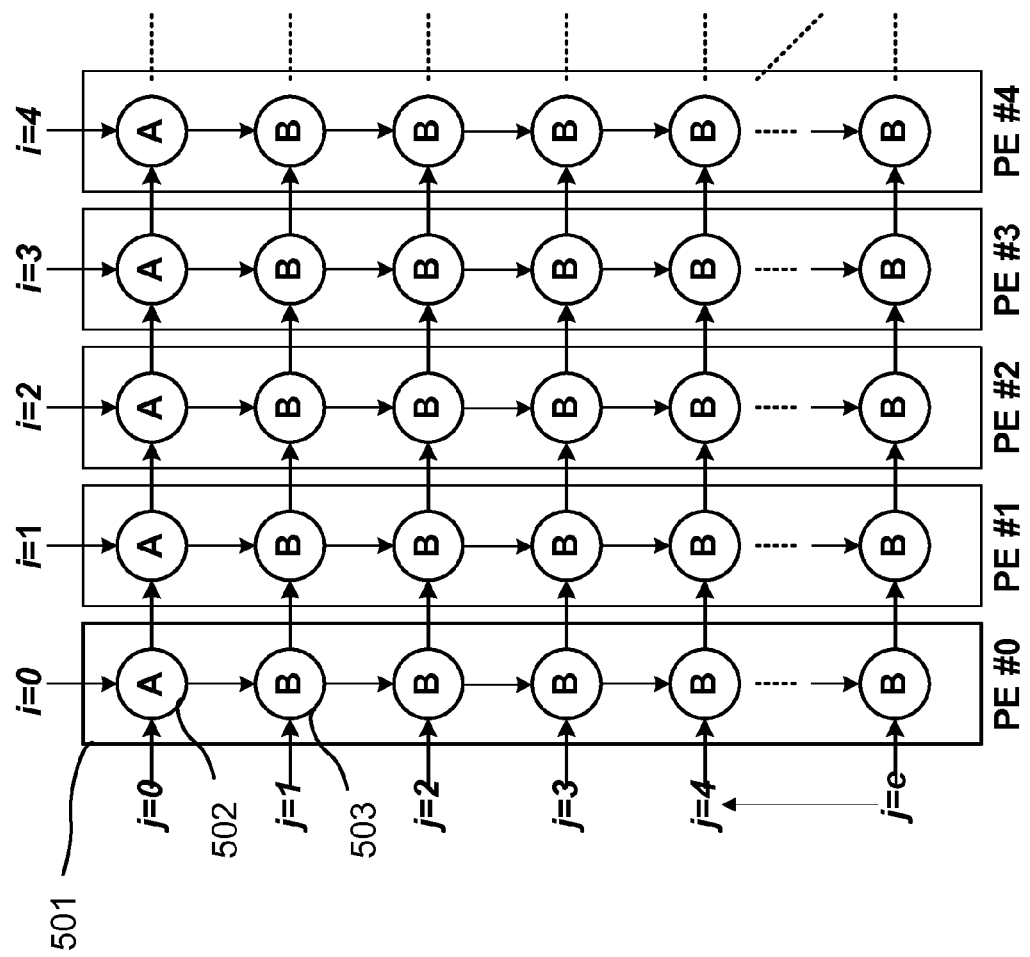
FIG. 5 is an illustration showing the mapping of an MWR2MM process to processing elements.

The data dependencies among the operations within the j loop make it impossible to execute the actions in a single iteration of the j loop in parallel. However, parallelism is possible among executions of different iterations of the i loop. Tenca and Koc suggested that each column in the graph may be computed by a separate processing element (PE), and the data generated from one PE may be passed into another PE in a pipelined fashion. FIG. 5 is an illustration showing the mapping of MWR2MM process to processing elements. Each processing element 501 may perform one task A 502 and e task B 503. Following this method, all atomic computations represented by circles in the same row could be processed concurrently. The processing of each column takes e+1 clock cycles (1 clock cycle for Task A 502, e clock cycles for Task B 503). Because there is a delay of 2 clock cycles between the processing of a column for $x_i$ and the processing of a column for $x_{i+1}$, the minimum computation time T (in clock cycles) is $T=2n+e-1$ given $$P_{max} = \left\lceil \frac{e+1}{2} \right\rceil$$

PEs are implemented to work in parallel. In this configuration, after e+1 clock cycles, PE #0 switches from executing column 0 to executing column $P_{max}$. After another two clock cycles, PE #1 switches from executing column 1 to executing column $P_{max}+1$, etc. With parameters optimized for minimum latency, this architecture performs a single Montgomery multiplication in approximately 2n clock cycles, where n is the size of operands in bits.

The opportunity of improving the implementation performance of Process 2 is to reduce the delay between the processing of two subsequent iterations of i loop from 2 clock cycles to 1 clock cycle. The 2-clock cycle delay comes from the right shift (division by 2) in both Process 1 and 2. Take the first two PEs in FIG. 4 for example. These two PEs compute the S words in the first two columns. Starting from clock #0, PE #1 has to wait for two clock cycles before it starts the computation of $S^{(0)}(i=1)$ in clock #2.

In this disclosure, embodiments of a new architecture are presented for Montgomery multiplication. The architecture utilizes parallelism by precomputing partial results using two different assumptions regarding the most significant bit of each partial result word.

An embodiment includes a Montgomery multiplication process for obtaining a Montgomery product of an operand X and an operand Y with respect to a modulus M. The Montgomery multiplication device 1400 has a plurality of processing elements (PEs) (1401, 1402 & 1403), which are interconnected in sequence. The processing elements include a first processing element 1401, at least one intermediate processing element 1402, and a last processing element 1403. The first PE 1401, the intermediate PE 1402, and the last PE 1403 have a comparable structure 1304. Each word of the Montgomery product may be calculated by the first PE 1401, an intermediate PE 1402 or the last PE 1403. Operands X and Y and the modulus M may be assumed to be n bits each, and $$e = \left\lceil \frac{n+1}{w} \right\rceil.$$

The Montgomery multiplication process in each PE (1401, 1402 & 1403) may comprise many modules. First, a word length w and a number of words e may be selected. The operand Y and the modulus M may be scanned as e words of length w, wherein e is at least 2. The operand X may be scanned as n bits.

In a first clock cycle of processing elements, a first intermediate partial sum 606 and a second intermediate partial sums 607 may be created.

The first intermediate partial sum 606 of length w may be created by obtaining an input of length w−1 1303 from a preceding processing element as w−1 least significant bits of the first intermediate partial sum 606. The most significant bit of the first intermediate partial sum 606 is configured as zero 603.

The second intermediate partial sum 607 of length w may be created by obtaining the same input of length w−1 1303 from the same preceding processing element as the w−1 least significant bits of the second intermediate partial sum 607. The most significant bit of the second intermediate partial sum 607 may be configured as one 604.

Then, a first partial sum and a second partial sum may be created using at least a word of the operand Y, a word of the modulus M, a bit of the first operand X, and the first intermediate partial sum 606 and second intermediate partial sum 607 respectively. Calculation of the first partial sum and the second partial sum further includes a one-bit carrier or a two-bit carrier. These calculations may be performed in processing element 1304.

In a second clock cycle of processing elements, a selection bit 1302 may be obtained from the preceding processing element. Either the first partial sum or the second partial sum is selected as the selected partial sum based on the value of the selection bit. Then, the selected partial sum may be used for calculation of a word of the Montgomery product. The selection bit 1302 may be the least significant bit of a partial sum calculated in the preceding processing element.

The Montgomery product may be calculated iteratively. The operand X may be processed iteratively bit-by-bit and the operand Y processed iteratively word-by-word.

Figure 6:
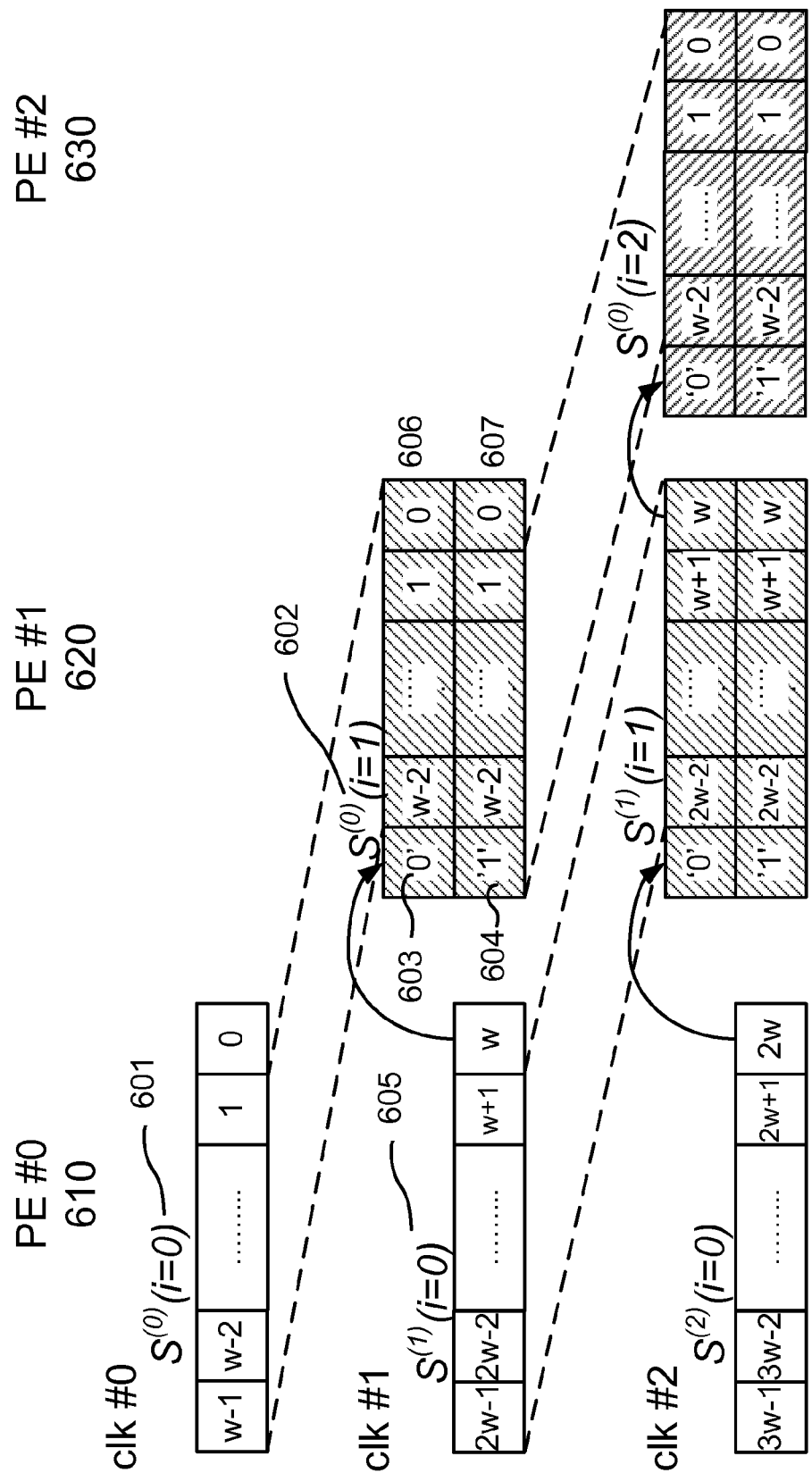
FIG. 6 is a diagram depicting a data operation in an architecture according to an aspect of an embodiment of the present invention.

Another embodiment is described in more detail. In order to reduce the 2-clock-cycle delay to half, another approach is presented in this embodiment. This embodiment pre-computes the partial results using two possible assumptions regarding the most significant bit of the previous word. FIG. 6 is a depiction of data operation in the architecture. As shown in FIG. 6, PE #1 620 may take the w−1 most significant bits of $S^{(0)}(i=0)$ 601 from PE #0 610 at the beginning of clock #1, do a right shift, and compute two versions of $S^{(0)}(i=1)$ 602, based on the two different assumptions about the most significant bit of this word at the start of computations. The first computation assumes the most significant bit is zero 603 and the second computation assumes the most significant bit is one 604. At the beginning of the clock cycle #2, the previously missing bit may become available as the least significant bit of $S^{(1)}(i=0)$ 605. This bit may be used to choose between the two precomputed versions of $S^{(0)}(i=1)$ 602. Similarly, in the clock cycle #2, two different versions of $S^{(0)}(i=2)$ and $S^{(1)}(i=1)$ may be computed by PE #2 630 and PE #1 620 respectively, based on two different assumptions about the most significant bits of these words at the start of computations. At the beginning of the clock cycle #3, the previously missing bits become available as the least significant bits of $S^{(1)}(i=1)$ and $S^{(2)}(i=0)$, respectively. These two bits could be used to choose between the two precomputed versions of these words. The same pattern of computations may be repeated in subsequent clock cycles. Furthermore, since e words are enough to represent the values in S, S(e) may be discarded in this design. Therefore, e clock cycles may be required to compute one iteration of S.

Figure 7:
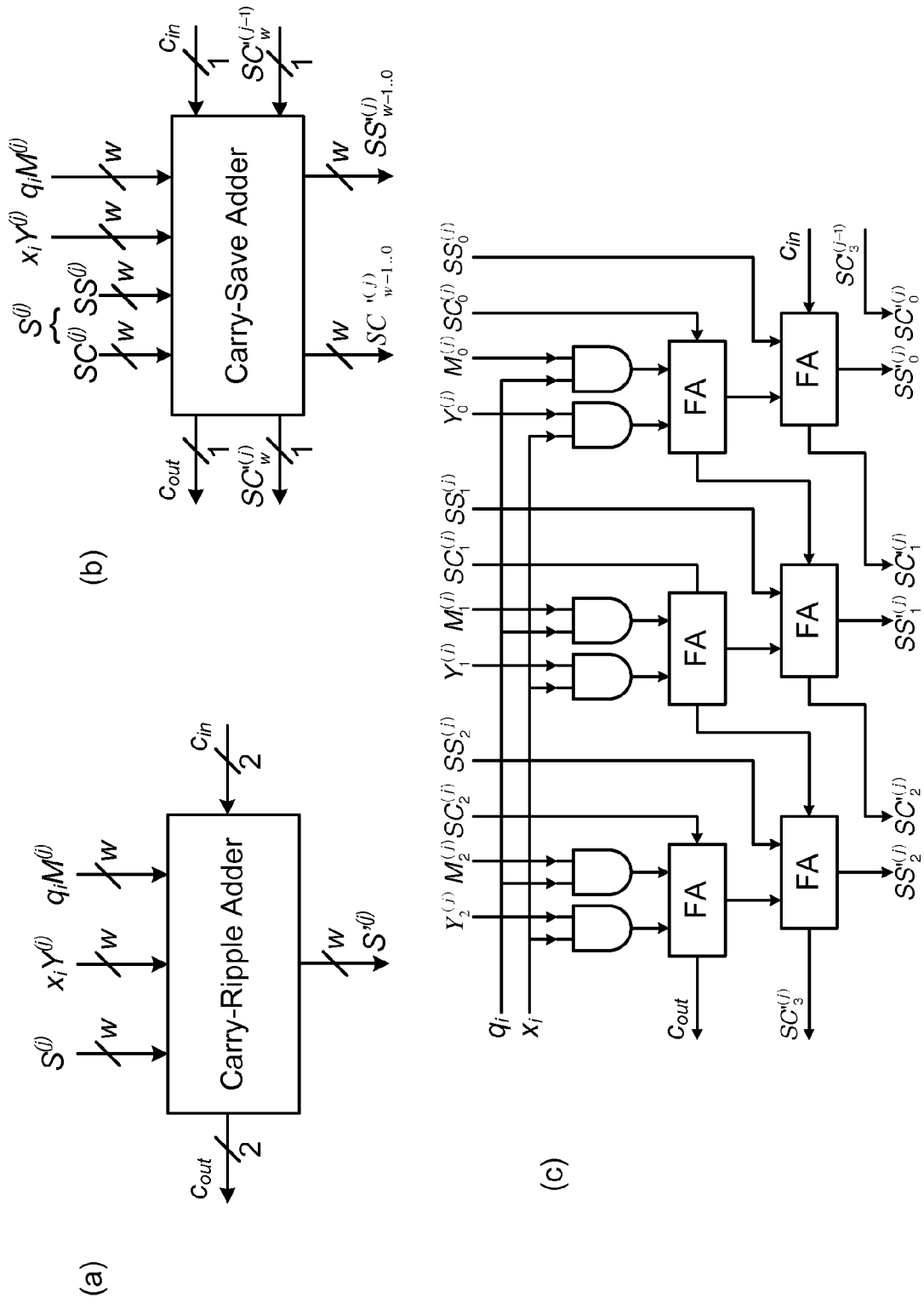
FIG. 7 shows aspects of embodiments of the present invention generating both non-redundant and redundant representation of a partial sum S.

FIG. 7(a) through (c) demonstrates the application of applying the disclosed embodiment. The disclosed embodiment could be applied onto both non-redundant and redundant representation of S. In FIG. 7(a), S is represented in non-redundant form. In FIG. 7(b), S is represented in redundant form. FIG. 7(c) shows a logic diagram to update an S word (w=3) in redundant form. It is logically straightforward to apply the approach when S is represented in non-redundant form because each digit of S includes of only one bit. When S is represented in redundant Carry-Save (CS) form, each digit of S includes two bits, the partial sum (SS) bit and the shift-carry (SC) bit. As shown in FIG. 7(b) and FIG. 7(c), after the update of $S^{(j)}$, only the partial sum bit of $S^{(j+1)}_0$, i.e., $SS^{(j+1)}_0$, is unknown. The shift-carry bit, $SC'^{(j+1)}_0$, can be forwarded to the next PE with $S^{(j)}_{w-1 \ldots 1}$. The same approach can be applied to update $S^{(j)}$.

Figure 8:
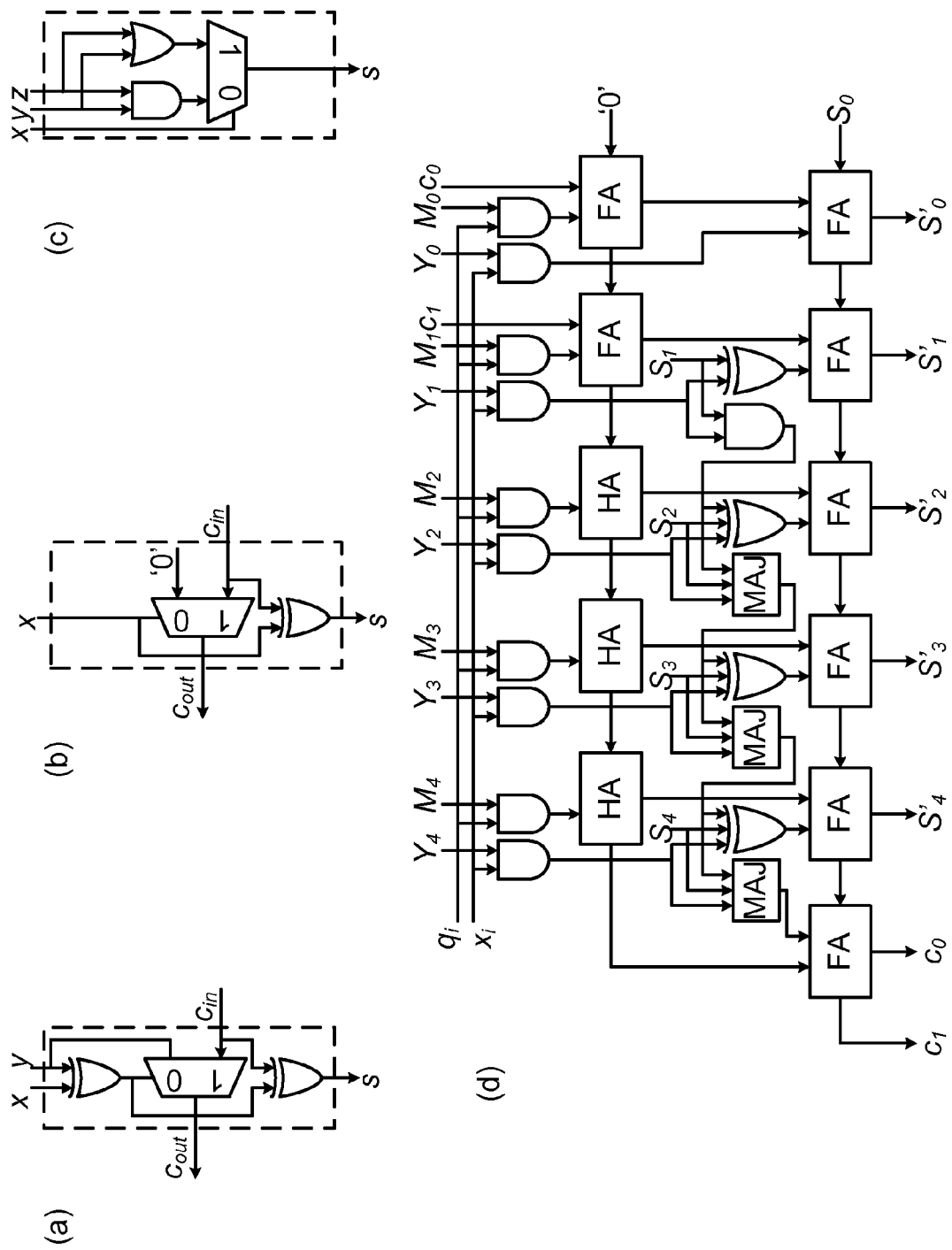
FIG. 8 illustrates aspects of embodiments of the present invention that implements $S^{(j)}+x_i.Y^{(j)}+q_i.M^{(j)}+c$ on a Xilinx Vitex-II FPGA device in non-redundant form.

FIGS. 8(a) through 8(d) are illustrations of an implementation of $S^{(j)} + x_i \cdot Y^{(j)} + q_i \cdot M^{(j)} + c$ on Xilinx Vitex-II FPGA device in non-redundant form. FIG. 8(a) illustrates the implementation of a Full Adder. FIG. 8(b) illustrates the implementation of a Half Adder. FIG. 8(c) illustrates the implementation of a MAJority logic block. And, FIG. 8(d) illustrates the implementation of a Logic diagram to update an S word (w=5). Two parallel chains of FAs (Full Adders) or HAs (Half Adders) may be used to perform the 3-input addition with carry. By observing the diagram in FIG. 8(d), w+3 FAs, w−2 HAs, w−2 MAJ blocks, 2w+1 AND gates and w−1 XOR gates may be required to update an S word in non-redundant form. On the other hand, FIG. 8(d) may require 2w FAs and 2w AND gates to carry out the same operation when S is represented in redundant form. The non-redundant form may be used in this embodiment and in diagrams and specifications for the sake of simplicity. The corresponding diagrams and implementations in redundant format can be derived from the non-redundant case accordingly.

Figure 9:
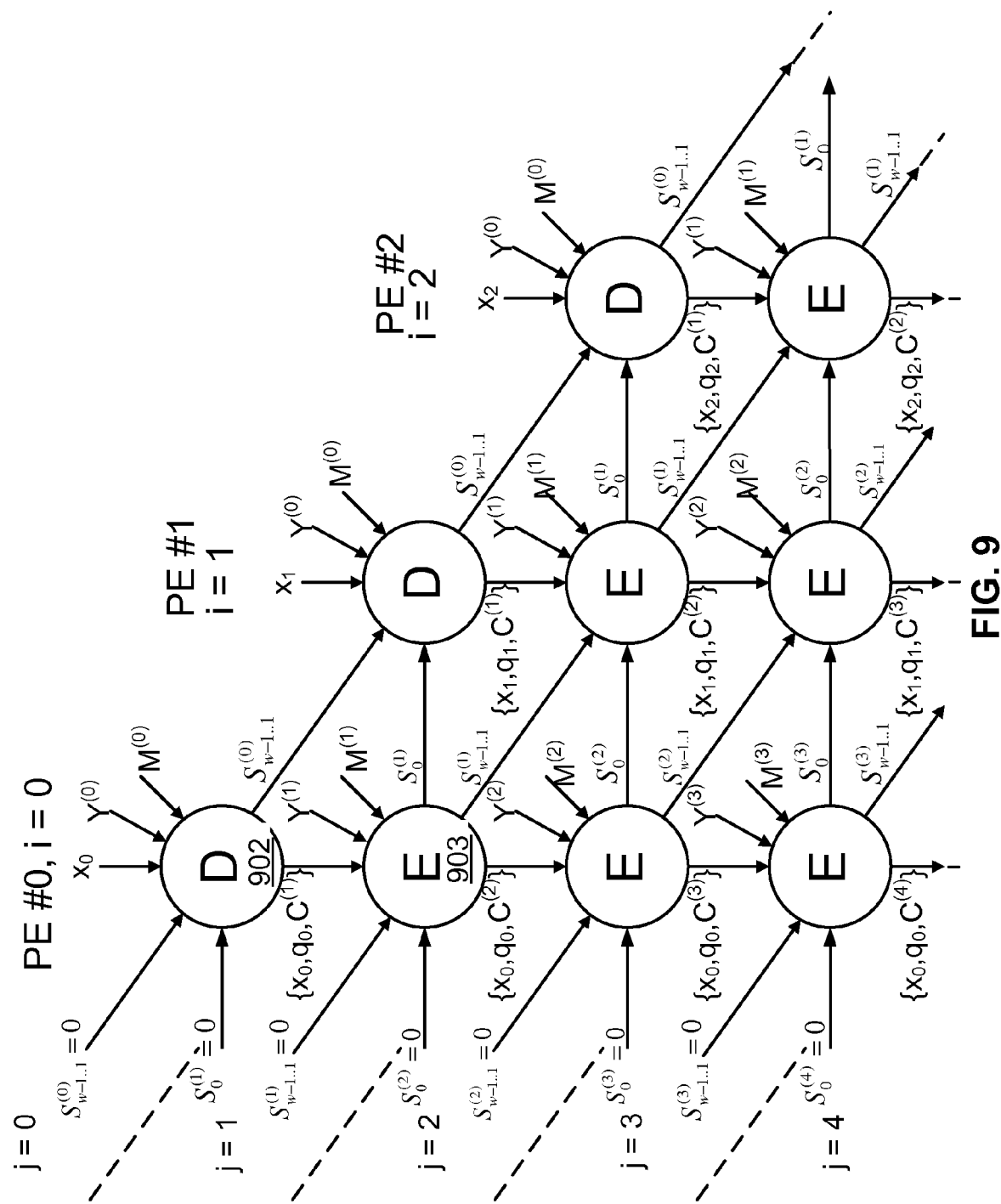
FIG. 9 is a data dependency graph of an architecture implementing a MWR2MM process as per an aspect of an embodiment of the present invention.
Figure 10:
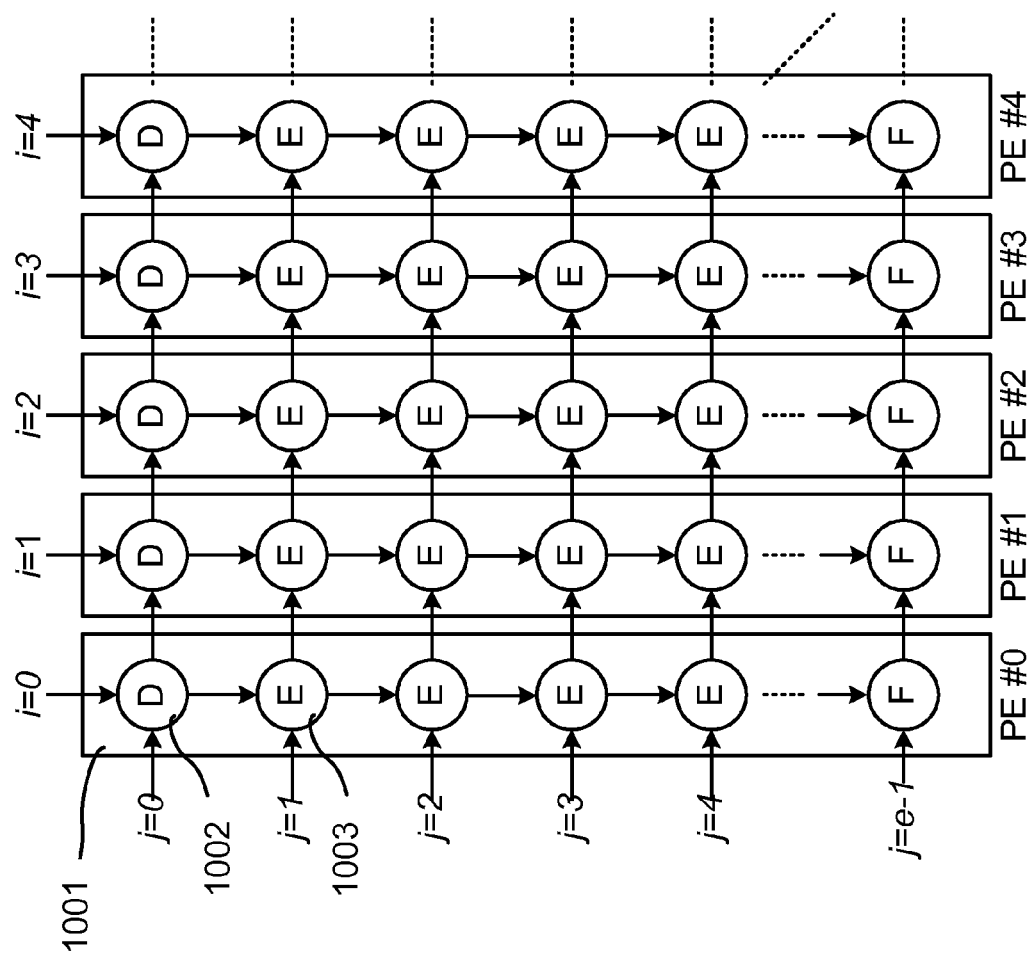
FIG. 10 is an illustration showing mapping of an MWR2MM process to processing elements as per an aspect of an embodiment of the present invention.

FIG. 9 is a data dependency graph of the optimized architecture for implementing MWR2MM process. The circle in the graph of FIG. 9 represents an atomic computation. Task D 902 may include three actions, the computation of $q_i$, the calculation of two sets of possible results, and the selection between these two sets of results using an additional input $S^{(1)}_0$, which may become available at the end of the processing time for Task D 902. FIG. 11 is a pseudocode for computations in Task D 902. These three actions are shown in Process 3 in FIG. 11. FIG. 12 is a pseudocode for computations in Task E 903. Task E may include two actions. These two actions are shown in Process 4 in FIG. 12. The data forwarding of $S^{(1)}_0$ and $S^{(j)}_{w-1\ldots 1}$ from one circle E to the two circles in the right column may take place at the same time. However, $S^{(j)}_0$ may be used for selecting the two partial results of $S^{(j-1)}$. And $S^{(j)}_{w-1}\ldots$ may be used for generating the two partial results of $S^{(j)}$. FIG. 10 is an illustration showing the mapping of optimized MWR2MM process to processing elements. Each processing element 1001 may perform 1 task D 1002 and e−1 task E 1003. Following this method, all atomic computations represented by circles in the same row could be processed concurrently.

The exact approach to avoiding the extra clock cycle delay due to the right shift is detailed as follows by taking Task E as an example. Each PE may first compute two versions of $C^{(j+1)}$ and $S^{(j)}_{w-1}$ simultaneously, as shown in Process 4 in FIG. 12. One version assumes that $S^{(1+1)}_0$ is equal to one, and the other assumes that this bit is equal to zero. Both results may be stored in registers. At the same moment, the bit $S^{(j+1)}_0$ becomes available and this PE can output the correct $C^{(j+1)}$ and $S^{(j)}$. For Task D, the computation of $q_i$ is performed in addition to the computation of $C^{(1)}$ and $S^{(0)}$.

Figure 13:
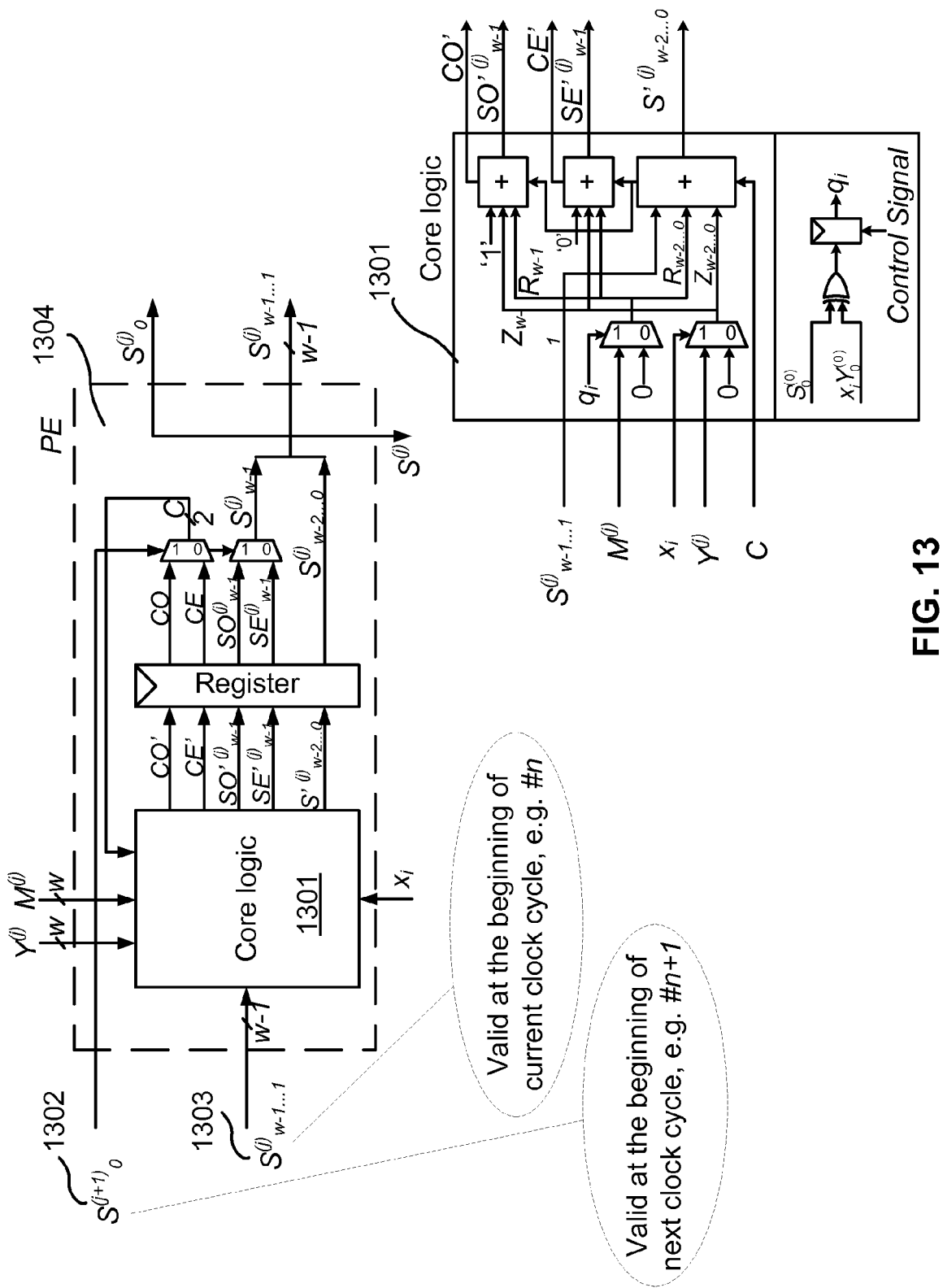
FIG. 13 is an example PE logic used in an architecture of an MWR2MM implementation as per an aspect of an embodiment of the present invention.

FIG. 13 is an example PE logic used in the optimized architecture of MWR2MM implementation. The signals at the left and right sides are for the interconnection purpose. The carry C is fed back to the combinational logic of the same PE. The signal $x_i$ remains unchanged during the computation of a whole column in FIG. 9. Another signal, $S^{(j)}$, is only for the final output at the end of the computation of the whole multiplication.

The core logic 1301 in FIG. 13 includes of two parts, the combination logic and a finite state machine. The multiplications of $x_i.Y^{(j)}$ and $q_i.M^{(j)}$ may be carried out using multiplexers. AND gate is another implementation option. On FPGA devices, it may leave the real implementation to the synthesis tool for the best option in terms of trade-off between speed and area. The direct implementation of two branches (i.e., line 4.1 and 4.2 in Process 4) requires using two carry-ripple adders (Carry-ripple adders could be used when S is represented in non-redundant form. When S is represented in redundant form, carry-save adders could be used instead.), each of which includes of three w-bit inputs and a carry. It is observed that these two additions only differ in the most significant bit of the S word and share everything else. Therefore, it is desired to consolidate the shared part between these two additions into one carry-ripple adder with three w−1-bit inputs and a carry. The remaining separate parts are then carried out using two small adders. Following this implementation, the resource requirement increases only marginally while performing a redundant computation of two different cases. When S is represented in redundant form, as shown in FIG. 7c, only one additional Full Adder is required to cover two possible cases of $SS^{(j)}_{w-1}$.

Figure 14:
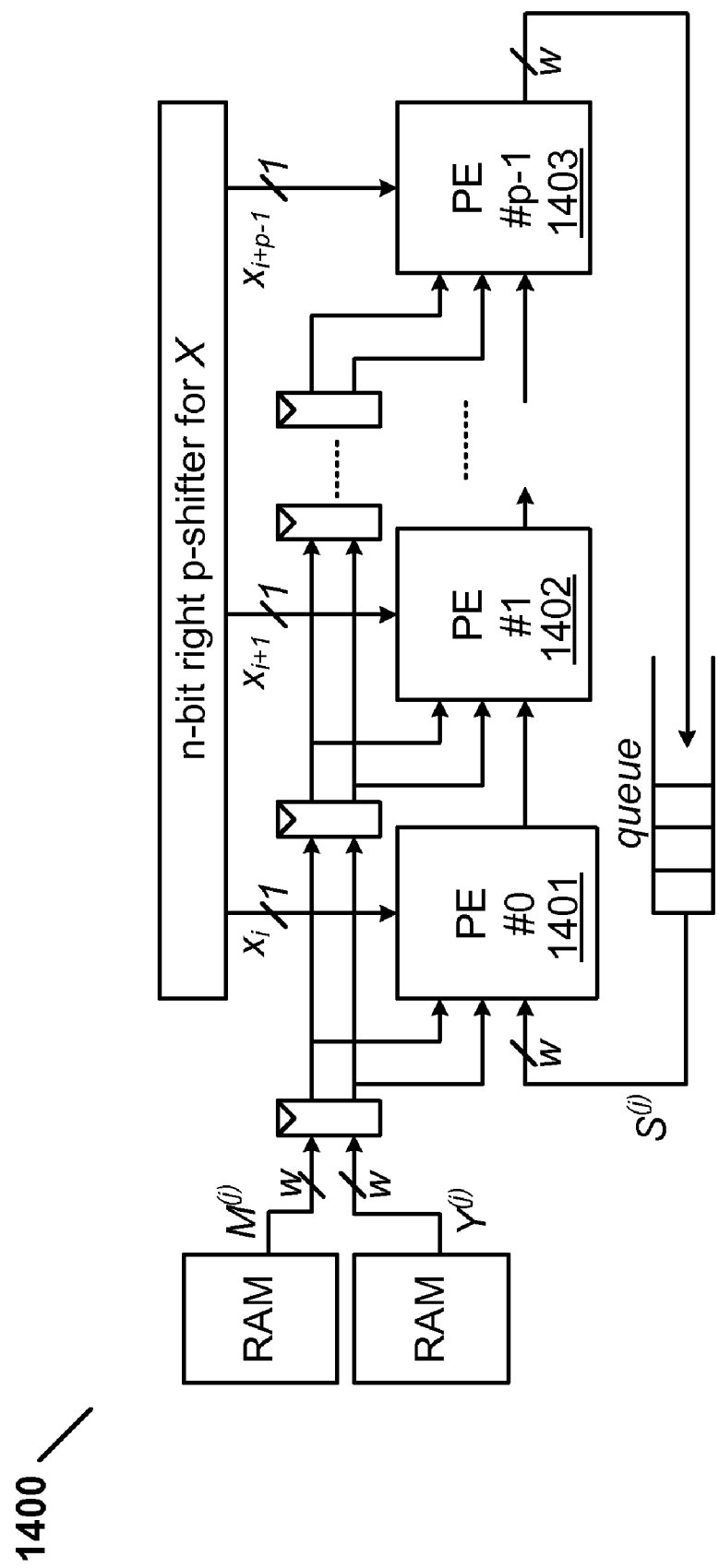
FIG. 14 is an illustration of an organization using p PEs to implement an MWR2MM process as per an aspect of an embodiment of the present invention.

The optimized architecture keeps the scalability of the original architecture. FIG. 14 is an illustration of an embodiment using p PEs to implement the MWR2MM process. Both $M^{(j)}$ and $Y^{(j)}$ are moved from left to right every clock cycle through registers. $S^{(j)}$ has been registered inside each PE. Therefore, it can be passed into the next PE directly. The total computation time T in clock cycles when p stages are used in the pipeline to compute the MM with n bits of precision is $$T = \begin{cases} n+e-1 & \text{if } e \leq p \\ n+k(e-p)+e-1 & \text{otherwise} \end{cases} \quad (6)$$

where $$k = \left\lfloor \frac{n}{p} \right\rfloor.$$

Figure 15B:
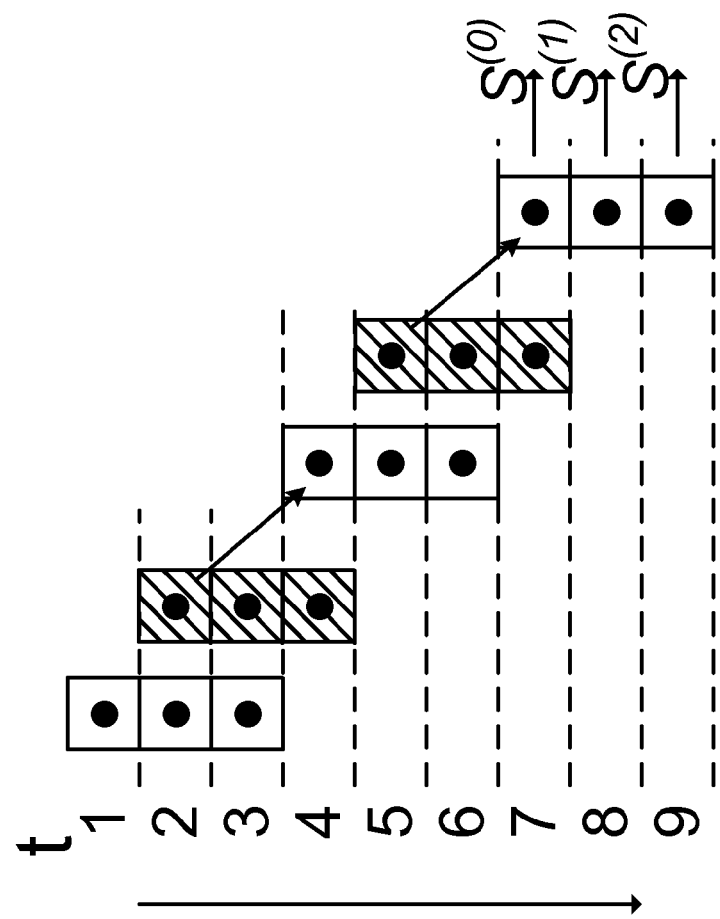
FIGS. 15A and 15B are illustrations of two example computations for 5-bit operands in an architecture using 3 PEs and 2 PEs as per an aspect of an embodiment of the present invention.
Figure 15A:
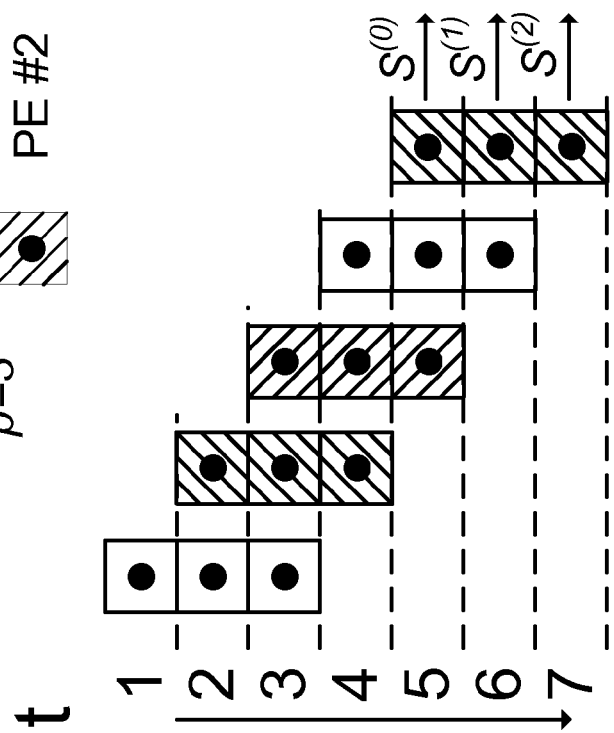

The first case shown in (6) represents the situation when there are more PEs than the number of words. Then it would take n clock cycles to scan the n bits in X and take another e−1 clock cycles to compute the remaining e−1 words in the last iteration. The second case models the condition when the number of words in the operand is larger than the number of PEs. If a kernel cycle is defined as the computation in which p bits of x are processed, then there is an e−p-clock-cycle extra delay between two kernel cycles. In this case, it would require k complete and one partial kernel cycles to process all n bits in X. Overall, the new architecture is capable of reducing the processing latency to half given maximum number of PEs. FIGS. 15a and 15b are illustrations of two example computations for 5-bit operands in the optimized architecture using 3 PEs and 2 PEs. If e>p, the output from the rightmost PE is put into a queue and processed by the leftmost PE later, as shown in the example in FIG. 15b. Since there is an e−p-clock-cycle extra delay between two kernel cycles, the length of the queue Q is determined as $$Q = \begin{cases} 0 & \text{if } e \leq p \\ e-p & \text{otherwise.} \end{cases} \quad (7)$$

The optimized architecture reduces the circuit latency by almost a factor of two, from 2n+e−1 clock cycles to n+e−1 clock cycles, with a negligible penalty in terms of the minimum clock period.

This architecture can be extended from radix-2 to radix-4 in order to further reduce the circuit latency at the cost of increasing the product of latency times area. The concepts illustrated in FIG. 9 may be adopted to design high-radix hardware architecture of Montgomery multiplication. Instead of scanning one bit of X every time, several bits of X could be scanned together for high-radix cases. Assuming k bits of X are scanned at one time, $2^k$ branches should be covered at the same time to maximize the performance. Considering the value of $2^k$ increases exponentially as k increments, the design becomes more complicated beyond radix-4.

FIG. 16 is a pseudocode for multiple-word Radix-4 Montgomery Multiplication process. Following the same definitions regarding words as in Process 2, the radix-4 version of Montgomery multiplication is shown as Process 6. Two bits of X may be scanned in one action this time instead of one bit as in Process 2. While reaching the maximal parallelism, the radix-4 version design takes n/2+e−1 clock cycles to process n-bit Montgomery multiplication.

The carry variable C has 3 bits, which can be proven in a similar way to the proof of the radix-2 case. The value of at line 6.3 of Process 6 is defined by a function involving $S^{(0)}_{1\ldots 0}$, $x^{(i)}$, $Y^{(0)}_{1\ldots 0}$ and $M^{(0)}_{1\ldots 0}$ so that (8) is satisfied.

$$S_{1\ldots 0}^{(0)} + x^{(i)}.Y_{1\ldots 0}^{(0)} + q^{(i)}.M_{1\ldots 0}^{(0)} = 0 \pmod 4 \quad (8)$$

Since M is odd, $M^{(0)}_0 = 1$. From (8), it could be derived $$q_0^{(i)} = S_0^{(0)} \oplus (x_0^{(i)}.Y_0^{(0)}) \quad (9)$$

where $x^{(i)}_0$ and $q^{(i)}_0$ denote the least significant bit of $x^{(i)}$ and $q^{(i)}$ respectively. The bit $q^{(i)}_1$ is a function of only seven one-bit variables and can be computed using a relatively small look-up table.

The multiplication by 3, which may be needed to compute $x^{(i)}.Y^{(j)}$ and $q^{(i)}.M^{(j)}$, could be done on the fly or avoided by using Booth recoding. Using the Booth recoding would require adjusting the process and architecture to deal with signed operands.

Furthermore, Process 6 could be generalized to handle MWR2kMM process. In general, $x^{(i)}$ and $q^{(i)}$ are both k-bit variables. $x^{(i)}$ is a k-bit digit of X, and $q^{(i)}$ is defined by (10).

$$S^{(0)} + x^{(i)}.Y^{(0)} + q^{(i)}.M^{(0)} \equiv 0 \pmod{2^k} \tag{10}$$

Nevertheless, the implementation of the proposed optimization for the case of k>2 would be more complicated.

Hardware Implementation of an Embodiment

The architecture has been fully verified by modeling them using Verilog-HDL, and comparing their function vs. reference software implementation of Montgomery multiplication based on the GMP library. The code has been implemented on Xilinx Virtex-II 6000 FPGA and experimentally tested on SRC-6 reconfigurable computer. The architecture is easily parameterizable, so the same generic code with different values of parameters can be easily used for multiple operand and word sizes.

The larger w is, the smaller the maximum clock frequency will be. The latency expressed in the number of clock cycles is equal to $n+\lceil((n+1)/w)\rceil-1$, and is almost independent of w for $w \geq 16$. Since actual FPGA-based platforms, such as SRC-6 used in the implementations, have a fixed target clock frequency, this target clock frequency determines the optimum value of w. Additionally, the same HDL code can be used for different values of the operand size n and the parameter w, with only a minor change in the values of respective constants.

The optimized architecture has been implemented in Verilog HDL, and its codes have been verified using reference software implementation. The results completely matched. Xilinx Virtex-I6000FF1517-4 FPGA device used in the SRC-6 reconfigurable computer has been selected for the prototype implementations. The synthesis tool has been Synplify Pro 9.1 and the Place and Route tool has been Xilinx ISE 9.1.

The word size w is fixed at 16-bit for most of the architectures implementing the MWR2MM process. Moreover, the 32-bit case of Architecture 2 is tested as well to show the trade-off among clock rate, minimum latency and area. The present embodiment can be implemented for any desired word size. In order to maximize the performance, the maximum number of PEs in the implementation of architecture is used. S is represented in non-redundant form. In other words, carry-ripple adders are used in the implementation.

Figure 17A:
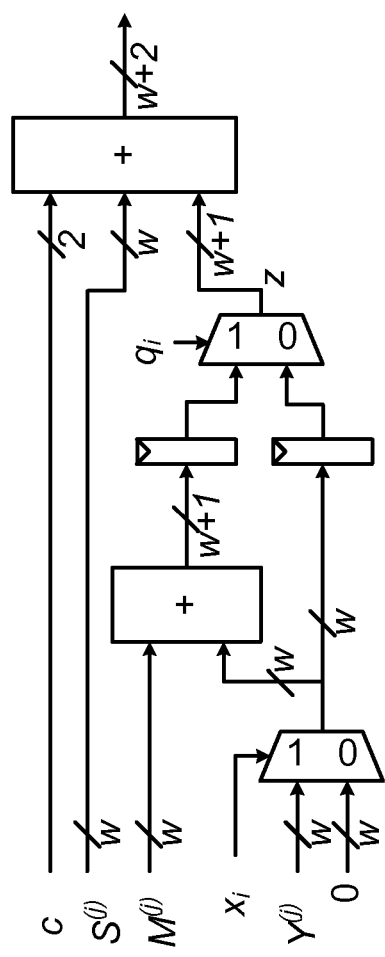
FIGS. 17A and 17B are illustrations of an architecture for distributed computation of $c+S^{(j)}+x_i.Y^{(j)}+q_i.M^{(j)}$ as per an aspect of an embodiment of the present invention.
Figure 17B:
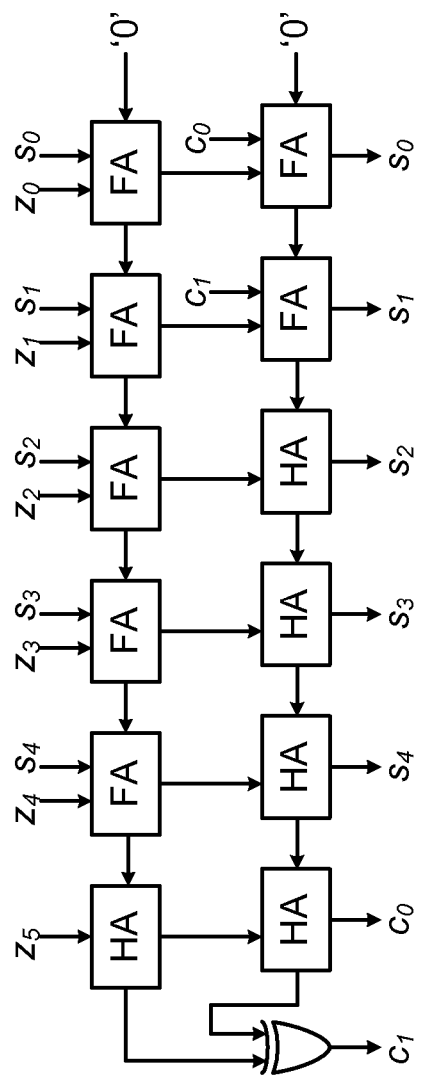

FIG. 17a and FIG. 17b are illustrations of an architecture for distribute computation of $c+S^{(j)}+x_i.Y^{(j)}+q_i.M^{(j)}$. In order to minimize the critic path delay in the carryripple addition of $c+S^{(j)}+x_i.Y^{(j)}+q_i.M^{(j)}$, this 3-input addition with carry is broken into two 2-input additions. FIG. 17a illustrates the logic diagram. As shown in FIG. 17a, $x_i.Y^{(j)}+M^{(j)}$ may be precomputed one clock cycle ahead of its addition with $S^{(j)}$. This technique is applied to the implementation to maximize the frequency. This design point is appropriate when the target device is an FPGA device with abundant hardware resources. When area constraint is of high priority, or S is represented in redundant form, this frequency-oriented technique may become unnecessary.

FIG. 17b illustrates the implementation of $S_{w-1\ldots 0} + Z_{w\ldots 0} + C_{1\ldots 0}$ on Xilinx Virtex-II FPGA device, w=5 ($Z_{w\ldots 0} = x_i.Y_{w-1\ldots 0} + q_i.M_{w-1\ldots 0}$). The real implementation of the second 2-input addition with carry on Xilinx Virtex-II device is shown in FIG. 17b w+2 full adders (FAs) and w half adders (HAs) form two parallel chains to perform the addition. Consider the w FAs used in the first addition, the implementation of the logic in FIG. 17a may require 3w+2 FAs or HAs. Compared with the 2w FAs used in FIG. 7c, the non-redundant implementation of Montgomery multiplication may consume approximately 50% more hardware resources than the implementation in redundant form on Xilinx Virtex-II platform.

The optimized architecture (radix-2 and w=16) gives a speedup by a factor of almost two compared with the architecture by Tenca and Koc, in terms of latency expressed in the number of clock cycles. The minimum clock period is comparable in both cases and extra propagation delay in using architecture of this embodiment is introduced only by the multiplexers directly following the Registers, as shown in FIG. 14.

The time between two consecutive Montgomery multiplications could be further reduced by overlapping computations for two consecutive sets of operands. In the original architecture by Tenca and Koc, this repetition interval is equal to 2n clock cycles, and in all other investigated architectures n clock cycles.

For radix-4 case, four different precisions, 1024, 2048, 3072, and 4096, of Montgomery multipliers have been implemented. The word-length is the same as the one in the radix-2 case, i.e., 16 bits. For all four cases, the maximum frequency is comparable for both radix-2 and radix-4 designs. Moreover, the minimum latency of the radix-4 designs is almost half of the radix-2 designs. In the meantime, the radix-4 designs occupy more than twice as many resources as the radix-2 versions. These figures fall within expectations because radix-4 PE has 4 internal branches, which doubles the quantity of branches of radix-2 version, and some small design tweaks and optimizations are required to redeem the propagation delay increase caused by more complicated combinational logic. Some of these techniques are listed below:

1) At line 6.6 of Process 6 there is an addition of three operands whose length is w-bit or larger. To reduce the propagation delay of this action, the value of $x^{(i)}.Y^{(j)}+q^{(i)}.M^{(j)}$ may be precomputed one clock cycle before it arrives at the corresponding PE.

2) For the first PE in which the update of $S^{(0)}$ and the evaluation of $q^{(i)}$ happen in the same clock cycle, the value of $x^{(i)}.Y^{(0)}+q^{(i)}.M^{(0)}$ may not be precompute in advance. Four possible values of $x^{(i)}.Y^{(0)}+q^{(i)}.M^{(0)}$ are precomputed corresponding to $q^{(i)}=0, 1, 2, 3$, and a decision may be made at the end of the clock cycle based on the real value of $q^{(i)}$.

A hardware implementation of embodiments beyond radix-4 may be more complicated considering the large resource cost for covering all the $2^k$ branches in one clock cycle, and the need to perform multiplications of words by numbers in the range $0 \ldots 2^k-1$.

Embodiments may preserve the scalability of the original design by Tenca and Koc. Further, it may outperform the Tenca-Koc design by about 23% in terms of the product of latency times area when implemented on a Xilinx Virtex-II 6000 FPGA.

It should be noted that references to "an" embodiment in this disclosure are not necessarily to the same embodiment, and they mean at least one. In this specification, "a" and "an" and similar phrases are to be interpreted as "at least one" and "one or more."

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, embodiments may be implemented using discrete logic as well as programmable logic devices such as an FPGA, an ASIC or the like. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "action for" be interpreted under 35 U.S.C. 112, paragraph 6. claims that do not expressly include the phrase "means for" or "action for" are not to be interpreted under 35 U.S.C. 112, paragraph 6.

What is claimed is:

1. A Montgomery multiplication process for obtaining a Montgomery product of a first operand X and a second operand Y with respect to a modulus M in a Montgomery multiplication device having a plurality of processing elements which are interconnected in sequence, said Montgomery multiplication process comprising:
   a) selecting a word length w and a number of words e;
   b) scanning said second operand Y and said modulus M as e words of length w, wherein e is at least 2;
   c) scanning said first operand X as n bits;
   d) in a first clock cycle of at least one of said plurality of processing elements:
      (1) creating a first intermediate partial sum of length w by:
         (a) obtaining an input of length w−1 from a preceding processing element in said plurality of processing elements as w−1 least significant bits of said first intermediate partial sum; and
         (b) configuring the most significant bit of said first intermediate partial sum as zero;
      (2) creating a second intermediate partial sum by:
         (a) obtaining said input as the w−1 least significant bits of said second intermediate partial sum; and
         (b) configuring the most significant bit of said second intermediate partial sum as one;
      (3) calculating a first partial sum bits using at least:
         (a) a word of said second operand Y;
         (b) a word of said modulus M;
         (c) a bit of said first operand X; and
         (d) said first intermediate partial sum; and
      (4) calculating a second partial sum bits using at least:
         (a) a word of said second operand Y;
         (b) a word of said modulus M;
         (c) a bit of said first operand X; and
         (d) said second intermediate partial sum; and
   e) in a second clock cycle of said at least one of said plurality of processing elements:
      i) obtaining a selection bit from said preceding processing element;
      ii) selecting either said first partial sum or said second partial sum as a selected partial sum based on the value of said selection bit; and
      iii) using said selected partial sum for calculation of a word of said Montgomery product.

2. The process of claim 1, wherein said selection bit is the least significant bit of a partial sum calculated in said preceding processing element.

3. The process of claim 1, wherein:
   a) said first operand X is n bits;
   b) said second operand Y is n bits;
   c) said modulus M is n bits; and $$d)\quad e = \left\lceil \frac{n+1}{w} \right\rceil.$$

4. The process of claim 1, wherein said Montgomery product is calculated iteratively.

5. The process of claim 1, wherein said first operand X is processed iteratively bit-by-bit.

6. The process of claim 1, wherein said second operand Y is processed iteratively word-by-word.

7. The process of claim 1, wherein calculating said first partial sum further includes a one-bit carrier or a two-bit carrier.

8. The process of claim 1, wherein each word of said Montgomery product is calculated by one of the following:
   a) a first processing element;
   b) an intermediate processing element; and
   c) a last processing element.

9. The process of claim 1, wherein said plurality of processing elements include:
a) a first processing element;
b) an intermediate processing element; and
c) a last processing element.

10. The process of claim 9, wherein said first PE, said intermediate PE, and said last PE have a comparable structure.

11. A Montgomery multiplication device for multiplying a first operand X and a second operand Y with respect to a modulus M in a Montgomery multiplication device having a plurality of processing elements including a first processing element, an intermediate processing element, and a last processing element, which are interconnected in sequence, said intermediate processing element comprising:
a) a modulus input configured to receive a word of a modulus M;
b) a second operand Y input configured to receive a word of said second operand Y;
c) a first operand X input configured to receive a bit of said first operand X;
a) a logic module, said logic module performs a logic process, said logic process comprising:
  i) in a first clock cycle:
    (1) creating a first intermediate partial sum of length w by:
      (a) obtaining an input of length w−1 from a preceding processing element in said plurality of processing elements as w−1 least significant bits of said first intermediate partial sum; and
      (b) configuring the most significant bit of said first intermediate partial sum as zero;
    (2) creating a second intermediate partial sum by:
      (a) obtaining said input as the w−1 least significant bits of said second intermediate partial sum; and
      (b) configuring the most significant bit of said second intermediate partial sum as one;
    (3) calculating a first partial sum bits using at least:
      (a) a word of said second operand Y;
      (b) a word of said modulus M;
      (c) a bit of said first operand X; and
      (d) said first intermediate partial sum;
    (4) calculating a second partial sum bits using at least:
      (a) a word of said second operand Y;
      (b) a word of said modulus M;
      (c) a bit of said first operand X; and
      (d) said second intermediate partial sum; and
  ii) in a second clock cycle:
    (1) obtaining a selection bit from said preceding processing element;
    (2) selecting either said first partial sum or said second partial sum as a selected partial sum based on the value of said selection bit; and
    (3) using said selected partial sum for calculation of a word of said Montgomery product.

12. The Montgomery multiplication device of claim 11, wherein said selection bit is the least significant bit of a partial sum calculated in said preceding processing element.

13. The Montgomery multiplication device of claim 11, wherein:
a) said first operand X is n bits;
b) said second operand Y is n bits;
c) said modulus M is n bits; and d) $e = \left\lceil \dfrac{n+1}{w} \right\rceil.$ 14. The Montgomery multiplication device of claim 11, wherein said Montgomery product is calculated iteratively.

15. The Montgomery multiplication device of claim 11, wherein said first operand X is processed iteratively bit-by-bit.

16. The Montgomery multiplication device of claim 11, wherein said second operand Y is processed iteratively word-by-word.

17. The Montgomery multiplication device of claim 11, wherein calculating said first partial sum further includes a one-bit carrier or a two-bit carrier.

18. The Montgomery multiplication device of claim 11, wherein said first partial sum and said second partial sum are smaller than the product of said modulus M by two.

19. The Montgomery multiplication device of claim 11, wherein each word of said Montgomery product is calculated by one of the following:
a) said first processing element;
b) said intermediate processing element; and
c) said last processing element.

20. The Montgomery multiplication device of claim 11, wherein said first PE, said intermediate PE, and said last PE have a comparable structure.

* * * * *